(12) United States Patent
Schuon (10) Patent No.: US 9,983,561 B2
(45) Date of Patent: May 29, 2018

(54) METHOD OF CONTROLLING A GEAR CUTTING MACHINE AND GEAR CUTTING MACHINE

(71) Applicant: Liebherr-Verzahntechnik GmbH, Kempten (DE)

(72) Inventor: Florian Schuon, Buchenberg (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 664 days.

(21) Appl. No.: 14/486,393

(22) Filed: Sep. 15, 2014

(65) Prior Publication Data

US 2015/0134102 A1  May 14, 2015

(30) Foreign Application Priority Data

Sep. 13, 2013 (DE) .................. 10 2013 015 234

(51) Int. Cl.
| | | |
|---|---|---|
| *B23Q 11/00* | (2006.01) | |
| *G05B 19/18* | (2006.01) | |
| *G05B 19/4061* | (2006.01) | |
| *G05B 19/4069* | (2006.01) | |

(52) U.S. Cl.
CPC ........ *G05B 19/186* (2013.01); *B23Q 11/0089* (2013.01); *G05B 19/4061* (2013.01); *G05B 19/4069* (2013.01); *G05B 2219/36198* (2013.01); *G05B 2219/37237* (2013.01); *G05B 2219/39082* (2013.01); *G05B 2219/49153* (2013.01)

(58) Field of Classification Search
CPC .............. B23Q 11/0089; G05B 19/186; G05B 2219/36198; G05B 2219/37237

USPC ........................................................ 700/160
See application file for complete search history.

(56) References Cited

U.S. PATENT DOCUMENTS

| 7,599,824 | B2 | 10/2009 | Shigemi et al. | |
|---|---|---|---|---|
| 2005/0159938 | A1* | 7/2005 | Shigemi ............... | G05B 19/186 703/7 |
| 2008/0018287 | A1* | 1/2008 | Ogawa ............... | G05B 19/4061 318/652 |
| 2011/0295576 | A1 | 12/2011 | Miyata et al. | |
| 2012/0179286 | A1* | 7/2012 | Hsu ..................... | G05B 19/4061 700/178 |

(Continued)

FOREIGN PATENT DOCUMENTS

| DE | 100 44 306 A1 | 4/2002 |
|---|---|---|
| DE | 103 45 626 A1 | 5/2005 |
| DE | 103 52 815 A1 | 6/2005 |

(Continued)

OTHER PUBLICATIONS

ChunHo et al, "Improvement of Collision Detection Performance of Hierachies by Using Dynamic-Density of 3D Objects Based on LOD (Level-of-Detail)." IEEE Computer Graphics, Imaging and Visualization (2007).

(Continued)

*Primary Examiner* — Yuhui R Pan
(74) *Attorney, Agent, or Firm* — Dilworth & Barrese, LLP (57) ABSTRACT

The invention relates to a method of controlling a gear cutting machine having at least one tool for cutting gears into a workpiece clamped in a workpiece mount, wherein the machine control carries out a three-dimensional collision monitoring during the gear cutting machining.

11 Claims, 5 Drawing Sheets

(56) References Cited

U.S. PATENT DOCUMENTS

2012/0213602 A1* 8/2012 Winkel .............. B23F 23/1218
409/61

FOREIGN PATENT DOCUMENTS

| DE | 10 2005 025 338 A1 | 12/2006 |
| DE | 10 2009 023 648 A1 | 12/2010 |
| DE | 10 2012 103 830 A1 | 11/2012 |
| DE | 10 2012 201 732 A1 | 8/2013 |
| EP | 1 018 677 B1 | 3/2006 |
| JP | 09-212222 A | 8/1997 |
| JP | 2001-222304 A | 8/2001 |
| WO | 2008/025577 A1 | 3/2008 |

OTHER PUBLICATIONS

Kief et al, "CNC-Handbuch Dec. 2011." Hanser, München (2011), pp. 416-447.

\* cited by examiner

METHOD OF CONTROLLING A GEAR CUTTING MACHINE AND GEAR CUTTING MACHINE

BACKGROUND OF THE INVENTION

The invention relates to a method of controlling a gear cutting machine having at least one tool for cutting gears in a workpiece clamped in a workpiece mount.

Known gear cutting machines comprise a plurality of controlled CNC axles to generate the required radial movements, tangential movements, axial movements, rotational movements, pivot movements or vertical movements of the tool, workpiece or other machine components for the gear cutting machining of workpieces. The CNC control of the gear cutting machine takes over the program-controlled control of the respective CNC axial drives.

Modern gear-cutting machines are increasingly configured in a universal manner so that they can be equipped and programmed for different gear cutting applications by adjustable machine components. Adjustable machine components comprise, for example, the machining head or a working mandrel clamped therein onto which mandrel one or more tools are placed as well as apparatus for clamping the workpiece or the workpiece itself. The variety and complexity of the adjustable machine components used makes the programming of the machine control more difficult. In addition, a number of machine parameters which relate to the individual adjustable machine components are required for the machine configuration for the program-controlled gear cutting process. As a rule, they have to be input by hand into the control by the operator.

An increased operating risk of the gear cutting machine results from the above problems since collisions can occur during the gear cutting process due to incorrect inputs or due to program codes having errors. For this reason, comprehensive protective measures are desirable which know how to prevent the risk of collision.

SUMMARY OF THE INVENTION

This object is achieved by a method in accordance with the features herein. Advantageous embodiments of the method are also the subject herein.

A method of controlling a gear cutting machine having at least one tool for cutting gears into a workpiece clamped in a workpiece mount is proposed. The gear cutting machine is suitable for manufacturing toothed gear wheels having inner teeth and outer teeth. In accordance with the invention, the machine control carries out three-dimensional collision monitoring during the gear cutting machining. The collision monitoring thus takes place in real time during the gear cutting machining. Ideally, each machining step of the gear cutting process is monitored for a potential collision.

The kinematics of specific machine components are monitored during the gear cutting process in at three-dimensional space. Individual machine components are virtually simulated in the machine control by three-dimensional objects and their movement routine is monitored for collisions in real time. The total gear cutting process is consequently simulated in a three-dimensional space model and is monitored for collisions or possible collisions. In addition, decision logics must distinguish between allowed collisions, for example between the tool, in particular the tool blade, and the workpiece, and non-allowed collisions.

Ideally, almost all machine components which are subject to process-dependent movements due to the gear cutting process are monitored for collision. The movements are feed movements, rotational movements or pivot movements. The collision monitoring is no longer limited to a pure monitoring of the tool blade, but rather all movable machine components are detected by the collision monitoring over their total periphery or practically total periphery.

The collision monitoring preferably comprises adjustable machine components which are installed in the gear cutting machine in dependence on the gear cutting process to be carried out. Adjustable machine components are in particular the machining head, a working mandrel clamped therein and having one or more tools placed on said mandrel, an apparatus for clamping a workpiece as well as the workpiece itself. There is an increased collision risk with adjustable machine components since their use makes manual configuration inputs or modifications of the machine control necessary. For this reason, a direct collision monitoring of these adjustable parts is particularly preferred.

In accordance with a preferred embodiment of the method, the machine components to be monitored are modeled as virtual three-dimensional bodies and their kinematics are monitored in a three-dimensional space with respect to their mutual spacing from one another. When a specific minimum spacing is fallen below, the collision monitoring can recognize a potential collision and inform the operator. Different limit values for specific constellations or machine components are conceivable.

It is, for example, conceivable that the virtual three-dimensional modeling takes place on the basis of an envelope function in that an envelope is laid around the corresponding machine component. The gear cutting operation is consequently monitored in a three-dimensional model using different three-dimensional envelopes.

It is conceivable that the resolution of the envelopes or enveloping bodies, i.e. the precision of the modeling, is determined in dependence on the distance from at least one other machine component. The resolution is in particular increased as the distance decreases. With a sufficiently large distance, the collision probability is smaller and a smaller resolution is sufficient for the modeling. An operation of the machine control is possible due to the smaller resolution which is less resource intensive. As the distance decreases, a high resolution is necessary due to the increasing collision probability.

In a preferred embodiment of the invention, the collision monitoring can be active during a CNC controlled gear cutting process and/or during a manually controlled gear cutting process. In addition to the pure gear cutting machining, which is monitored for collisions, such a monitoring can also be activated for a workpiece change or a tool change since a substantial risk of collision is also impending with a specific machine constellation with these specific machining processes.

The collision monitoring preferably works in a predictive manner in that the future kinematics of the machine components are monitored for collisions during the program routine. Further movement parameters can be derived from the program code of the machine control. On a manual machine operation of the gear cutting machine, future movement parameters of one or more machine components are estimated by suitable prediction processes.

If the collision monitoring recognizes a collision, the machine control of the gear cutting machine can stop, slow down or interrupt the gear cutting machining. This applies both to the recognition of a possible risk of collision and directly prior to the occurrence of a collision. After the recognition of a risk of collision or of a collision, the machine control can output an alarm on a suitable display unit. A visual representation of the collision situation, in particular of the involved machine components, is conceivable here.

It is conceivable alternatively to carry out the collision monitoring offline. The collision monitoring carried out offline is in particular useful when possible potential collision sites and risks are to be recognized and avoided in advance directly before the start of the gear cutting process after the adjustment process of the gear cutting machine. It is conceivable in this connection that a virtual simulation of the intended gear cutting process takes place within the machine control after a complete configuration of the gear cutting machine and consequently potential collision sites can be recognized. Suitable counter-measures can thus be taken before the start of the gear cutting process to be able to reduce the risk as much as possible.

The invention furthermore relates to a gear cutting machine having a machine control for carrying out the method in accordance with the invention or for carrying out an advantageous embodiment of the method in accordance with the invention. The gear cutting machine obviously has the same advantages and properties as the method in accordance with the invention, so that a repeat description is not considered necessary at this point.

In addition to the gear cutting machine, the invention moreover relates to control software stored on a data carrier for carrying out the method in accordance with the invention or an advantageous embodiment of the method. The control software can be loaded onto a corresponding machine control of a gear cutting machine and serves for the carrying out of the method in accordance with the invention during the gear cutting process.

BRIEF DESCRIPTION OF THE DRAWINGS

Further advantages and properties of the invention will be explained in the following in more detail with reference to an embodiment shown in the drawings. There are shown.

DESCRIPTION OF THE PREFERRED EMBODIMENTS

Figure 1:
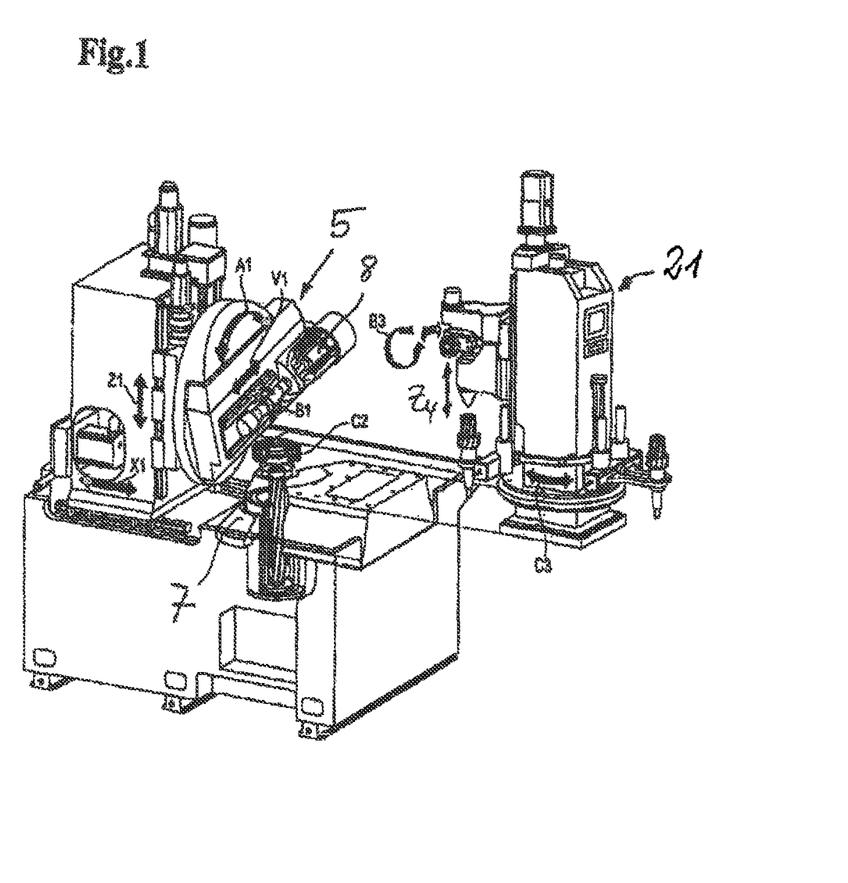
FIG. 1: a representation of a known CNC gear cutting machine.

FIG. 1 shows a representation of a known CNC gear cutting machine for manufacturing a toothed workpiece. The CNC gear cutting machine shown here is of a known design and will therefore not be explained again in detail. The different movement directions are drawn in the schematic perspective representation of the CNC controlled milling or grinding machine for generating or profile machining. Five standard axles of the CNC machine can be seen from the representation which can be divided into three linear axles X1, Z1, V1 as well as into the three rotational axles A1, B1 and C2. The rotational axle A1 serves the inward pivoting of the tool, not shown; the rotational axle B1 is responsible for the rotational movement of the tool used; and the rotational axle C2 designates the rotational movement of the workpiece to be machined on the workpiece table 7 and likewise not shown here. The three linear axles X1, Z1 and V1 serve the radial movement of the tool (X1), the feed movement of the tool (Z1), and the tangential movement of the tool (V1).

In addition, a back rest is provided in the representation which can take over different functions, for example for integrating a counter-holder arm, a ring loader, etc. The rotational axle C3 is, for example, suitable for carrying out the rotational movement of a ring loader.

Figure 2:
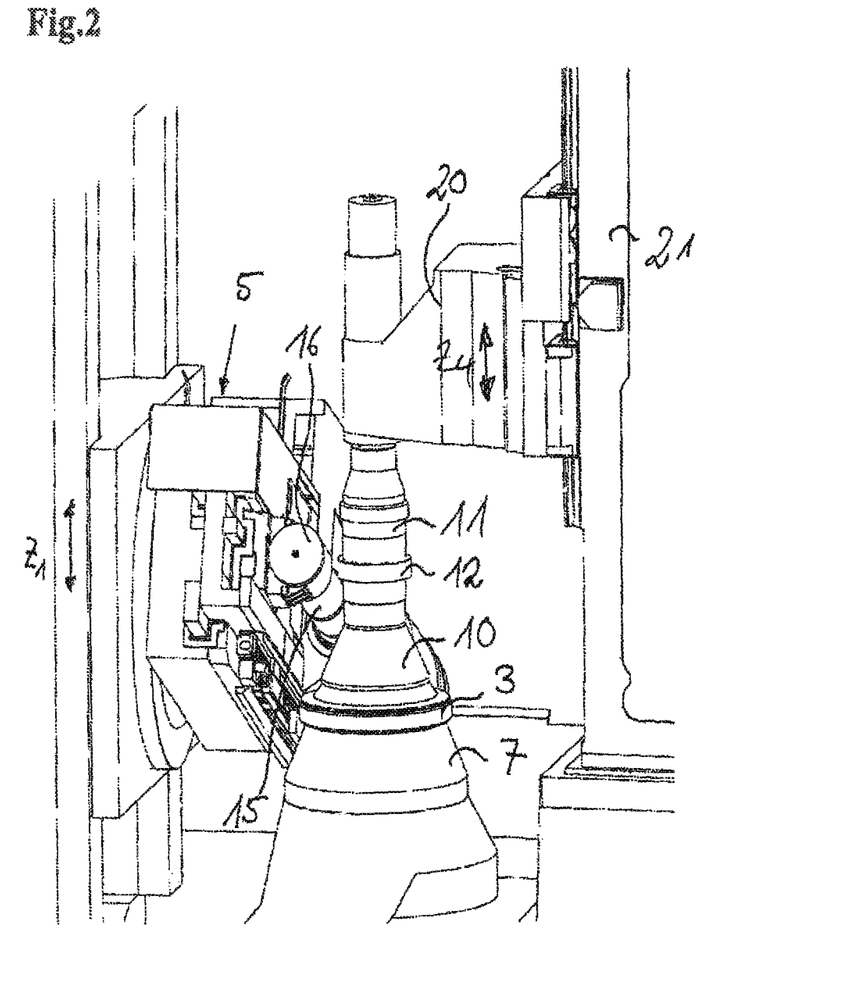
FIG. 2: a perspective part view of the inner machine space of a gear cutting machine starting from the loading door.

FIG. 2 shows a perspective view of the machine space during the cutting machining of a workpiece 12. The cutting head 5 can be seen from the representation which is supported at the tool stand slide pivotably about the axis A1. In addition, the cutting head 5 can be fed vertically for the tool feed movement in the Z1 axle direction and in a linear fashion for the radial movement of the tool 15 horizontally in the X1 direction.

Figure 3:
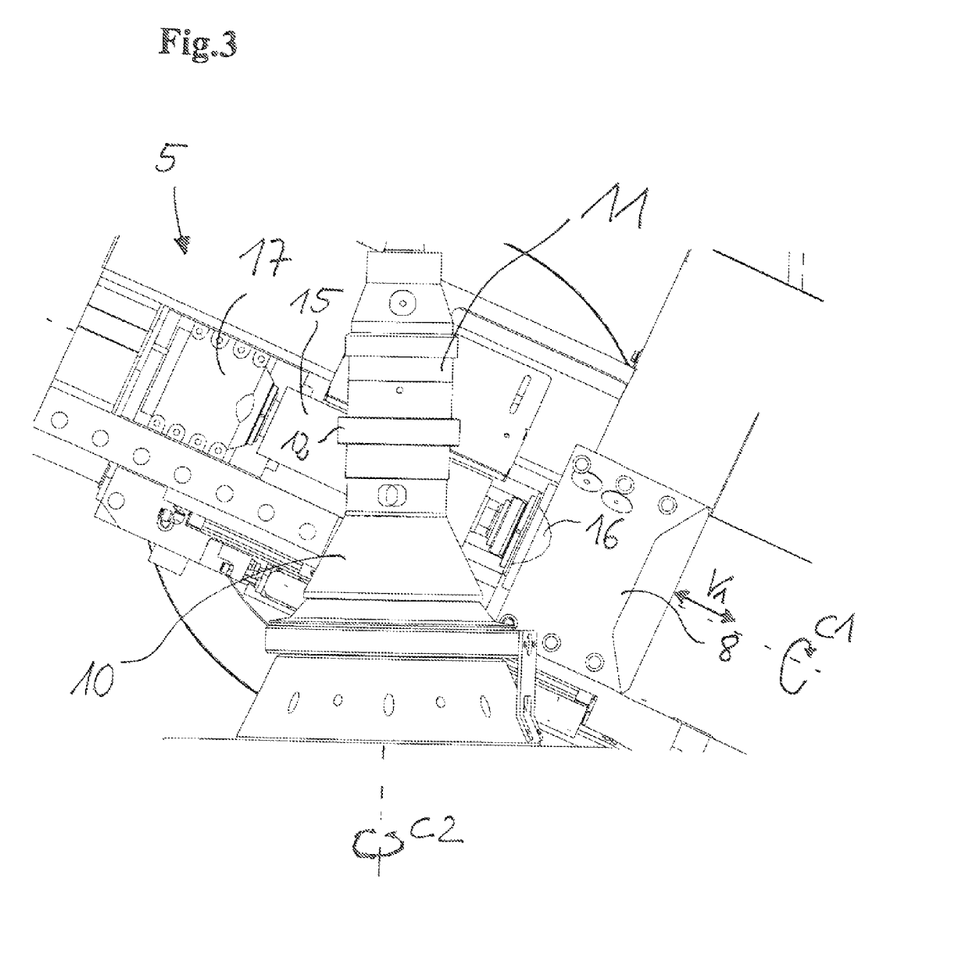
FIG. 3: a perspective detailed view of the machining head from the loading side.

FIG. 3 shows the inner space of the gear cutting machine from the loading side, with it being shown without automation or back rest. It can be seen in this respect that the cutting head 5 is pivoted about the axle A1 by a specific pivot angle to generate a specific helix direction of the workpiece to be prepared. Due to the huge size of the machining head, the risk of collision between the cutting head 5 and the machine bed 7 or machine table 3 can in particular be recognized. The cutting head 5 comprises the main bearing 17 with the drive unit 8 as well as a counter-bearing 16 (FIG. 3). The working mandrel is clamped in the machining head bed disposed therebetween and the cutter 15 is placed onto said mandrel rotatably about the B1 axle.

The machine table 7 supports the table plate 3 for receiving an apparatus for clamping the workpiece 12. The apparatus is divided into a lower apparatus part 10 as well as an upper apparatus part 11 which grip and clamp the workpiece 12 from the bottom and the top. The total apparatus 10, 11 is rotatable with the workpiece about the workpiece rotational axle C2. The upper apparatus part 11 is taken up by the counter-holder arm 20 which is in turn supported in a linearly movable manner at the back rest 21 in the Z4 direction.

In the shown gear cutting machining scenario, there is an increased probability of a collision between the main bearing or counter bearing 17, 16 of the cutter 15 with the apparatus 10, 11 if the cutting head 5 is pivoted about the axle A1 or if the cutting head 5 is in an extreme outer position shifted in the V1 direction so that the counter-bearing 16 or the main bearing 17 is at the level of the rotational axis C2 of the workpiece and the cutting head 5 is fed to the workpiece 12 in the X1 or Z1 direction in this position.

There is also a substantial risk of collision between the cutting head 5 and the machine bed 7 or the machine table 3 when the cutting head 5 is obliquely inwardly pivoted to the left or to the right depending on the helix direction of the toothed wheel 12 to be prepared. This position is dependent on the helix angle of the cutting of the gear into the workpiece 12 and on the pitch direction of the tool 15. In this case, the feed in the X1 direction and in the Z1 direction also plays a role. The smaller the workpiece diameter of the workpiece 12, the greater the risk of possible collisions between the cutting head 5 and the machine bed 7 or the machine table 3.

The individual movable components of the gear cutting machine, i.e. the machining head 5, including the tool 15 as well as the bearing points 16, 17 and the drive 8, the machine table 7, the table plate 3, the apparatus 10, 11, the counter-holder arm 20 and the counter-holder insert 22 as well as the workpiece 12 are modeled as three-dimensional objects for the carrying out of the collision monitoring and are taken into account for the virtual collision monitoring in a three-dimensional space. For this purpose, the named components are modeled by enveloping bodies which are laid around the periphery of the corresponding components. The resolution or the precision at which the individual part components are modeled depends on the spacing between the respective components which can result in a possible collision. If the machining head 5 is, for example, remote from the machine table or from the table plate at a specific distance, the collision monitoring can work with a smaller precision, with a simplified envelope function being used which neglects the fine structural aspects of the machining head or of the other part components. The closer the machining head 5 approaches the table plate 3 or the machine table 7, the more exactly the modeling of the individual components has to be to be able to recognize possible collisions.

In addition, a distinction must also be made as to which parts of specific components may collide with one another or may not collide. This in particular relates to the tool 15 which is naturally in engagement with the workpiece 12 and may not result in a collision recognition. On the modeling of the machining head 5, it is therefore necessary to distinguish between the tool part 15 and the bearings 16, 17 or the drive 8 of the machining head. However, a collision of the tool 15 with another machine part differing from the workpiece 12 has to be recognized and suppressed.

Figure 4:
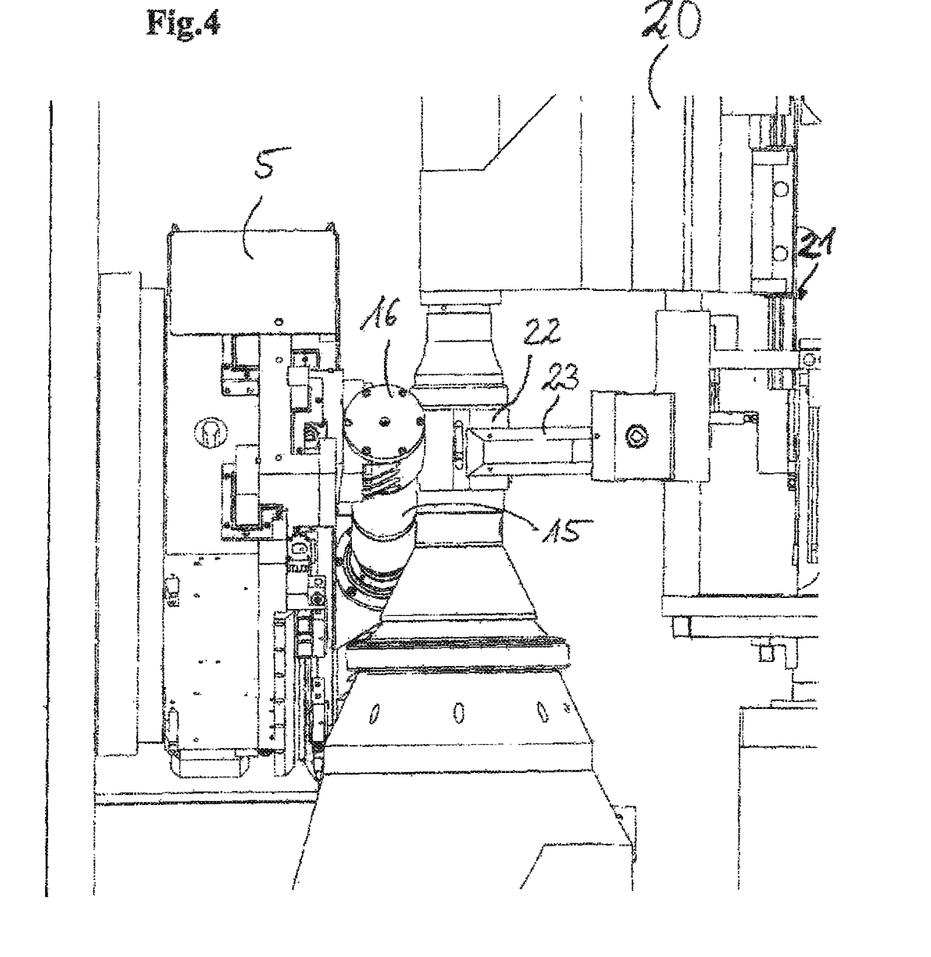
FIG. 4: a side view into the machine space of the gear cutting machine with a supplied ring loader.

FIG. 4 shows a view of the machine space with the back rest 21 which carries a so-called ring loader. The ring loader here has a gripper arm 23 which can grip the workpiece to be machined via a matching gripper insert 22 and can thus automatically carry out a workpiece change during the gear cutting process. In this respect, there is likewise an increased collision potential between the main bearing and the counter-bearing 17, 16 of the machining head 5 with the gripping inserts 22 of the gripper arm 23 when the cutting head 5 is shifted in the V1 direction. Consequently, the gripper insert 22 and the gripper arm 23 of the ring loader are modeled as virtual 3D objects and are taken into account for the collision monitoring.

Figure 5:
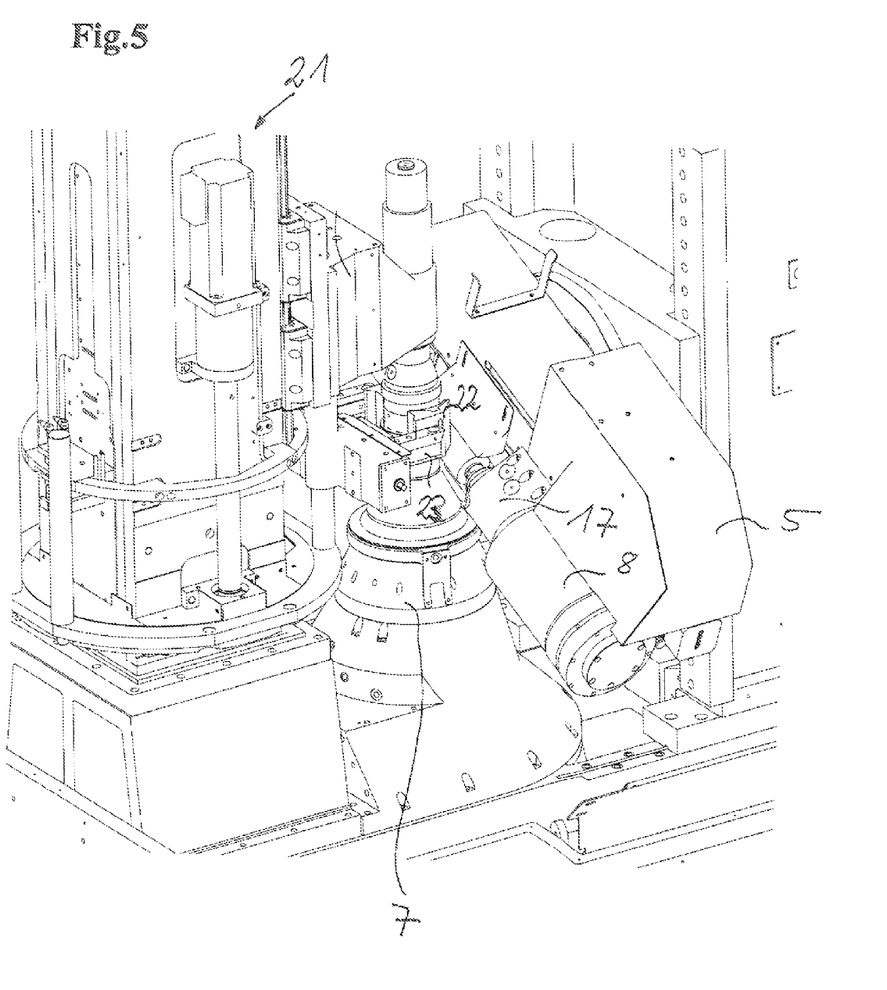
FIG. 5: a perspective side view of the drawing of FIG. 4 from the opposite side.

FIG. 5 shows the machine space from the opposite side, from which it can be seen that the bearings 16, 17 of the machining head 5 may collide with the gripper insert 22 on a shift movement.

As was already initially explained, a number of machine parameters which relate to the individual adjustable machine components have to be input manually into the machine control for the program-controlled gear cutting process. To reduce the proneness to error of these inputs, the gear cutting machine has a touch-sensitive display for the required machine configuration before the start of the gear cutting process. The machine control here allows a virtual three-dimensional representation of specific machine components and/or machining processes of the gear cutting machine. The machine thereby offers the user the possibility of modeling an actually adjusted machine part, i.e. tool 15, apparatus 10, 11, workpiece 12, ring loader including gripper arm 21, 23, gripper insert 22, etc. by a graphical modeling on the display element. The required parameters for the machine control are subsequently derived directly from the prepared modeling and provided for the gear cutting machining of the machine control. The required control configuration takes place quasi no longer by inputting pure numbers, but visually on the basis of a graphical modeling. The raw data of the machine components required for the visual representation can immediately be used for the collision monitoring.

The graphical modeling and presentation on the display element offers the user the possibility for the visual monitoring of his/her input. The user can consequently compare the prepared graphical model on the display element with the actually set up machine part; obvious errors are noticed and can be avoided in advance. Additional calculation steps are completely dispensed with. This process substantially reduces the probability of incorrect manual inputs.

The user can precisely match the graphical modeling to the actually used machine part by interaction with an operating panel or with the display element. Ideally, the graphical representation of the at least one machine part is calculated by a rendering process of the machine control. The raw data or scene information required for this purpose are stored in a database of the gear cutting machine.

In a preferred embodiment of the method, the rendering process takes place in real time and the underlying scene can be interactively varied by the operator. The operator can, for example, vary the angle of view and the zoom of the representation interactively by a user input; the calculation of the computer-based model takes place in real time and is immediately visualized on the display element.

The display element is expediently touch-operable, in particular multitouch-operable, so that the operator can vary the scene of the graphically modeled machine part by touching the display element. A multitouch-operable display element is in particular used so that the scene can be varied interactively by various multifinger gestures.

The user can make use of a database of the gear cutting machine for the graphical modeling of at least one machine part. A machine part, for example the apparatus 10, 11 or the working mandrel, can here be composed of a number of diverse individual components. The user is offered a selection option to virtually compose the set-up working mandrel. The database offers the user various types of mandrel for this purpose which can be equipped with suitable tools as well as spacer sleeves, etc. The user can ideally graphically model any actual working mandrel to scale using the database. The control-relevant parameters for the machine control are automatically derived from the graphical modeling and supplied to the machine control. A manual configuration of the gear cutting machine with respect to the machine part used is no longer necessary.

In addition to the purely visual plausibility control of the user, a virtual plausibility control of the graphical modeling takes place in the background by the machine control. A check and monitoring is in particular made here whether the inputs, i.e. the graphical modeling, of the user make sense and do not result in an incorrect behavior or in a collision during the subsequent gear cutting machining. For example, the virtual plausibility control takes place while taking account of a planned machining program for gear cutting and/or while taking account of the assembled components of a machine part and/or while taking account of further machine parts which can be set up. A monitoring is conceivable such as whether a working mandrel is composed of an expedient selection of part components. It is also monitored whether a required apparatus for the workpiece clamping was adjusted or configured for the planned machining.

The machine control can display the result of the plausibility control and optionally output warning messages and can force a machine stop in an emergency.

It is also conceivable that the geometrical modeling of the machine part or at least of an individual component of the machine part can be modified by user input. The user can consequently not only select individual machine parts or machine part components from the database, but can rather model or modify them individually by user input in real time, in particular with respect to their geometrical dimensions, their positioning, location or alignment with respect to other machine part components, etc. Possible properties of the machine part or of the machine part component can also be modified and adapted. This in particular applies on the use of different tools which can be adapted by user input with respect to their number of gears, number of teeth, etc. to the actually used machine part components.

The database can be expanded by a corresponding interface, in particular by supplementary entries on the machine parts or machine part components. This applies equally to the required raw data for the rendering process.

The invention claimed is:

1. A method of controlling a gear cutting machine having at least one tool for cutting gears into a workpiece clamped in a workpiece mount, comprising the following steps without manual input:
   carrying out a three-dimensional collision monitoring during gear cutting machining with a machine control,
   monitoring predictive collision during a CNC controlled gear cutting process by monitoring future movement parameters of machine components for collisions,
   deriving the future movement parameters from the program code of the machine control,
   modeling adjustable machine components as virtual three-dimensional bodies for the collision monitoring and modeling movement routines of the virtual three-dimensional bodies with respect to their distances from one another,
   automatically deriving control relevant parameters for the machine control from the modeling adjustable machine components and the modeling movement routines, and
   controlling the gear cutting machine based on the predictive collision monitoring and the derived control relevant parameters, without manual input before, during or after gear cutting.

2. A method in accordance with claim 1, comprising laying an envelope about each machine component for the virtual three-dimensional modeling of the machine components.

3. A method in accordance with claim 1, comprising determining resolution of the three-dimensional modeling of a machine component in dependence on the distance from at least one further machine part; and increasing the resolution as the distance decreases.

4. A method in accordance with claim 1, wherein modeled machine components are one or more of the following tools: a working spindle, tools placed onto a mandrel, a machining head, an apparatus for clamping a workpiece, a workpiece, a machine table, a machine bed, a ring loader, a gripper arm, a gripper insert, a counter-holder arm.

5. A method in accordance with claim 1, comprising activating the collision monitoring during a workpiece change and/or during a tool change.

6. A method in accordance with claim 1, comprising stopping the gear cutting machining if a collision is present and/or a risk of collision is recognized, and outputting an alarm with a collision description.

7. A method in accordance with claim 6, wherein the alarm is a visual graphical representation of a collision case on a display element.

8. A method in accordance with claim 1, comprising carrying out the collision monitoring offline to recognize possible potential collisions after machine adjustment and before the gear cutting machining.

9. A gear cutting machine having a machine control for carrying out a three-dimensional collision monitoring without manual input, wherein the machine control is configured to:
   monitor predictive collision during a CNC controlled gear cutting process by monitoring future movement parameters of machine components for collisions,
   derive the future movement parameters from the program code of the machine control,
   model adjustable machine components as virtual three-dimensional bodies for the collision monitoring and model movement routines of the virtual three-dimensional bodies with respect to their distances from one another,
   automatically derive control relevant parameters for the machine control from the modeling adjustable machine components and modeling movement routines, and
   control the gear cutting machine based on the predictive collision monitoring and the derived control relevant parameters, without manual input before, during or after gear cutting.

10. A method in accordance with claim 7, wherein the alarm is a three-dimensional graphical representation of affected machine components.

11. A method of controlling a gear cutting machine having at least one tool for cutting gears into a workpiece clamped in a workpiece mount, comprising the following steps without manual input:
   carrying out a three-dimensional collision monitoring during gear cutting machining with a machine control,
   monitoring predictive collision during a CNC controlled gear cutting process by monitoring future movement parameters of machine components for collisions,
   deriving the future movement parameters from the program code of the machine control,
   modeling adjustable machine components as virtual three-dimensional bodies for the collision monitoring and modeling movement routines of the virtual three-dimensional bodies with respect to their distances from one another,
   automatically deriving control relevant parameters for the machine control from the modeling adjustable machine components and modeling movement routines, and
   controlling the gear cutting machine based on the predictive collision monitoring and the derived control relevant parameters, without manual input before, during or after gear cutting, and
   comprising monitoring future movement of
   rotation (B1) of the tool (15),
   inward pivoting (A1) of the tool (15) and a cutting head (5),
   rotation (C2) of a workpiece (12) being manufactured by the tool (15),
   radial movement (XI) of the tool (15) and the cutting head (5),
   feed movement (Z1) of the tool (15) and the cutting head (5),
   tangential movement (VI) of the tool (15) and the cutting head (5),
   rotation (C3) of a ring loader with gripper arms (23) and gripper inserts (22), and
   axial movement (Z4) of a counter-holder arm (20).

* * * * *